(12) United States Patent
Li et al.

(10) Patent No.: US 10,164,889 B1
(45) Date of Patent: Dec. 25, 2018

(54) HIGH THROUGHPUT FLOW CONTROL

(71) Applicant: Oracle International Corporation, Redwood Shores, CA (US)

(72) Inventors: Suxiang Li, Beijing (CN); Peter Girard Dunlap, Boulder, CO (US); Zhouheng Zhuang, San Carlos, CA (US); Tzongyu Paul Lee, Campbell, CA (US); Le Zhang, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/703,807

(22) Filed: Sep. 13, 2017

(51) Int. Cl.
*H04L 12/807* (2013.01)
*H04L 12/815* (2013.01)
*H04L 12/835* (2013.01)
*H04L 12/801* (2013.01)
*H04L 12/825* (2013.01)

(52) U.S. Cl.
CPC ............ *H04L 47/27* (2013.01); *H04L 47/225* (2013.01); *H04L 47/30* (2013.01); *H04L 47/14* (2013.01); *H04L 47/263* (2013.01); *H04L 47/29* (2013.01)

(58) Field of Classification Search
CPC ....... H04L 47/14; H04L 47/263; H04L 47/27; H04L 47/36; H04L 43/00; H04L 47/50
See application file for complete search history.

(56) References Cited

U.S. PATENT DOCUMENTS

| 5,873,244 A | 2/1999 | Cobo et al. |
| 2006/0092845 A1 | 5/2006 | Kwan et al. |
| 2011/0188377 A1 | 8/2011 | Kim et al. |

*Primary Examiner* — Mewale A Ambaye
(74) *Attorney, Agent, or Firm* — Ferguson Braswell Fraser Kubasta PC

(57) ABSTRACT

A method for flow control may include obtaining a number of added receive buffers based on adding receive buffers to a shared receive queue, obtaining initiators each including a protocol data unit (PDU) window size, obtaining a number of active initiators based on determining whether each of the initiators is associated with an active network session, calculating a credit using the number of added receive buffers and the number of active initiators, determining that an initiator is associated with an active network session, and adjusting the PDU window size of the initiator using the credit.

15 Claims, 9 Drawing Sheets

HIGH THROUGHPUT FLOW CONTROL

BACKGROUND

Flow control is used to mediate access to a shared resource pool used by multiple clients. One approach to flow control is to use an extra network protocol layer to implement flow control. However, this additional layer adds complexity to the protocol stack. Another approach requires clients to predict how many requests to send, for example, based on analyzing how the resource pool responded to previous requests. For example, the clients may be initiators in the context of the iSER protocol (iSCSI extension for Remote Direct Memory Access (RDMA)). When resource usage at the target server exceeds a threshold, the target may notify clients to decrease the number of requests. However, not all clients may be able to implement the predictive capability. Another simple approach is to restrict the number of active requests for each client to a small, fixed request window. However, using a small request window may unnecessarily limit throughput when there are sufficient resources to handle a larger volume of requests.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for flow control including obtaining a number of added receive buffers based on adding receive buffers to a shared receive queue, obtaining initiators each including a protocol data unit (PDU) window size, obtaining a number of active initiators based on determining whether each of the initiators is associated with an active network session, calculating a credit using the number of added receive buffers and the number of active initiators, determining that an initiator is associated with an active network session, and adjusting the PDU window size of the initiator using the credit.

In general, in one aspect, one or more embodiments relate to a system for flow control including initiators each including a protocol data unit (PDU) window size, and a target including a shared receive queue. The target is configured to obtain a number of added receive buffers based on adding receive buffers to the shared receive queue, obtain a number of active initiators based on determining whether each of the initiators is associated with an active network session, calculate a credit using the number of added receive buffers and the number of active initiators, determine that an initiator is associated with an active network session, and adjust the PDU window size of the initiator using the credit.

In general, in one aspect, one or more embodiments of the invention relate to a non-transitory computer readable medium including instructions that, when executed by a processor, perform a method for flow control including obtaining a number of added receive buffers based on adding receive buffers to a shared receive queue, obtaining initiators each including a protocol data unit (PDU) window size, obtaining a number of active initiators based on determining whether each of the initiators is associated with an active network session, calculating a credit using the number of added receive buffers and the number of active initiators, determining that an initiator is associated with an active network session, and adjusting the PDU window size of the initiator using the credit.

Other aspects of the invention will be apparent from the following description and the appended claims.

DETAILED DESCRIPTION

Figure 1:
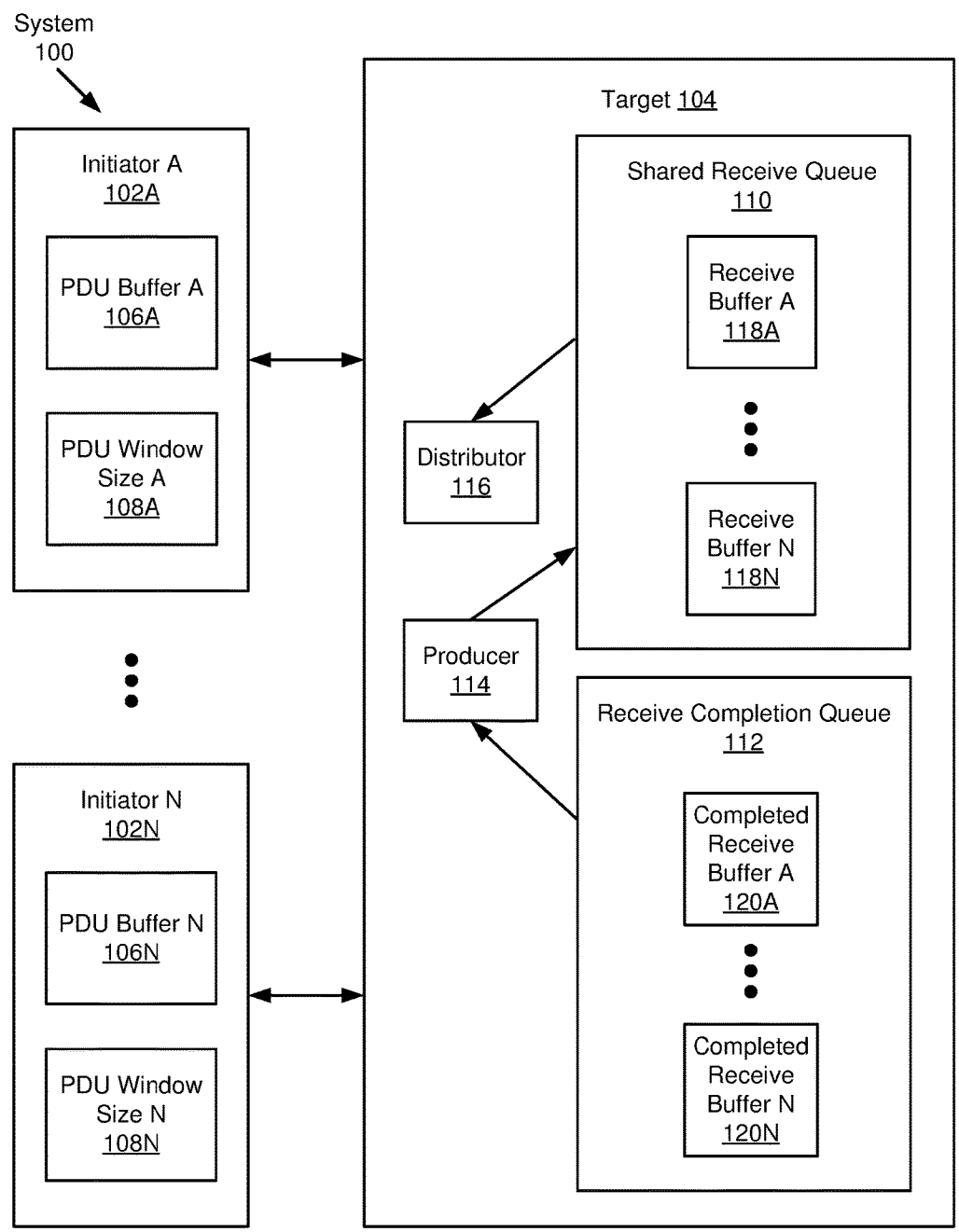
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the invention are directed to a system, method, and non-transitory computer readable medium for flow control. In one or more embodiments, to prevent initiators from overloading a target server with protocol data units (PDUs), the number of PDUs that each initiator may transmit is adaptively limited by the target. A PDU (e.g., a packet) may include information added or removed by a layer of the open-system interconnection (OSI) model. The target may set a PDU window size for each initiator that determines the maximum number of PDUs that the initiator is permitted to send to the target for processing without waiting for acknowledgment by the target. The target may evenly distribute credits (i.e., additions to the PDU window size) to active initiators based on the number of receive buffers added to a shared resource queue of the target. The target may reduce the PDU window size for an initiator when the target processes a PDU for the corresponding initiator.

FIG. 1 shows a system (100) in accordance with one or more embodiments of the invention. As shown in FIG. 1, the system (100) includes initiators (102A, 102N) and a target (104). In one or more embodiments, each initiator (102A, 102N) and the target (104) may be all or part of a computing system, such as, for example, the computing system (500) discussed below in the description of FIG. 5A, or may be all or part of a client device, such as, for example, the client device (526) discussed below in the description of FIG. 5B. In one or more embodiments of the invention, the initiators (102A, 102N) and the target (104) may communicate via a computer network (not shown) (e.g., the network (520) described with respect to FIG. 5B).

In one or more embodiments, an initiator (102A, 102N) includes a PDU buffer (106A, 106N) and a PDU window size (108A, 108N). In one or more embodiments, an initiator (102A, 102N) includes functionality to send PDUs to the target (104) via a network. A PDU may describe a task to be performed by the target (104). For example, the PDU may be a read request to transfer data from the target (104) to the initiator (102A, 102N). Alternatively, the PDU may be a write request to transfer data from the initiator (102A, 102N) to the target (104). In one or more embodiments, the PDU may be a protocol data unit (PDU) to be processed by the target (104). A PDU (e.g., a packet) may include information added or removed by a layer of the open-system interconnection (OSI) model.

In one or more embodiments, a PDU window size (108A, 108N) describes the availability of a shared pool of receive buffers (118A, 118N) at the target (104). If the PDU window is open (i.e., the PDU window size (108A, 108N) is greater than zero) then the initiator (102A, 102N) may be free to transmit PDUs to the target (104), which may then be copied into shared receive buffers (118A, 118N) for processing by the target (104). In one or more embodiments, the PDU buffer (106A, 106N) includes PDUs that cannot be sent to the target (104) by the initiator (102A, 102N) when the PDU window size (108A, 108N) is zero (i.e., when the "PDU window" is closed). Once the PDU window size (108A, 108N) is increased above zero, the initiator (102A, 102N) may be free to transmit some or all of the PDUs in the PDU buffer (106A, 106N) to the target (104). In one or more embodiments, a PDU may be removed from the PDU buffer (106A, 106N) once the PDU is transmitted to the target (104). Properly setting the PDU window size (108A, 108N) may prevent an initiator (102A, 102N) from overloading the capacity of the target (104) to process PDUs.

As a non-limiting example, within the context of the iSCSI protocol, the PDU window size (108A, 108N) may be implemented using the values of the parameters ExpCmdSN and MaxCmdSN, which refer to command sequence numbers associated with commands (e.g., PDUs) within a network session. ExpCmdSN is the next command sequence number expected by the target (104) from the initiator (102A, 102N). In this non-limiting example, when the target (104) acknowledges receipt of a command from an initiator (102A, 102N), the target (104) sends the corresponding command sequence number back to the initiator (102A, 102N). Thus, when the initiator (102A, 102N) receives the command sequence number from the target (104), the initiator (102A, 102N) may update the ExpCmdSN parameter to indicate that the next command sequence number expected by the target (104) has increased by 1. Commands whose command sequence numbers are less than ExpCmdSN may be assumed to have been already acknowledged by the target (104).

MaxCmdSN is the maximum command sequence number the initiator (102A, 102N) is permitted to send to the target (104). The PDU window size (108A, 108N) may be calculated as the difference between MaxCmdSN and ExpCmdSN plus 1. For example, if ExpCmdSN is 4 and MaxCmdSN is 6, then the PDU window size (108A, 108N) is 3.

Continuing this non-limiting example, when ExpCmdSN increases, the PDU window size (108A, 108N) decreases, and when MaxCmdSN increases, the PDU window size (108A, 108N) increases. In addition, when ExpCmdSN=MaxCmdSN+1 (i.e., the next expected command sequence number exceeds the maximum permitted command sequence number), then the target (104) may reject new PDUs from the initiator (102A, 102N).

Continuing with FIG. 1, in one or more embodiments, the target (104) includes a shared receive queue (110), a receive completion queue (112), a producer (114), and a distributor (116). In one or more embodiments, the shared receive queue (110) includes receive buffers (118A, 118N). In one or more embodiments, the shared receive queue (110) includes functionality to store PDUs sent by initiators (102A, 102N) into receive buffers (118A, 118N). Each receive buffer (118A, 118N) may be assigned a PDU. In one or more embodiments the shared receive queue (110) includes a capacity that determines the maximum number of receive buffers (118A, 118N). In one or more embodiments, the shared receive queue (110) includes a number of available receive buffers (118A, 118N) that may be assigned PDUs. receive buffer In one or more embodiments, the receive completion queue (112) includes completed receive buffers (120A, 120N). Each completed receive buffer (120A, 120N) may include a received PDU previously associated with (e.g., stored in) an available receive buffer (118A, 118N) of the shared receive queue (110). In one or more embodiments, the receive completion queue (112) includes functionality to process received PDUs (e.g., by initiating a read or write data transfer, as indicated by the corresponding PDU). Each received PDU in the receive completion queue (112) may include information about the PDU in the receive buffer (118A, 118N). For example, a received PDU may include the location of a buffer corresponding to a read or write request of an initiator (102A, 102N).

In one or more embodiments, the target (104) includes functionality to move a received PDU from the shared receive queue (110) to a completed receive buffer (120A, 120N) of the receive completion queue (112). In one or more embodiments, the target (104) includes functionality to use received PDUs of the receive completion queue (112) when notifying an initiator (102A, 102N) about the results of a previously transmitted PDU. In one or more embodiments, the target (104) includes functionality to track active network sessions with initiators (102A, 102N).

In one or more embodiments, the producer (114) may be implemented in hardware (e.g., circuitry), software, firmware, and/or any combination thereof. In one or more embodiments, the producer (114) includes functionality to replenish the shared receive queue (110) by adding PDUs additional receive buffers (118A, 118N) to the shared receive queue (110). In one or more embodiments, the added receive buffers (118A, 118N) correspond to completed receive buffers (120A, 120N) of the receive completion queue (112) that have been fully processed, and can therefore be recycled (e.g., freed). In one or more embodiments, the producer (114) runs as a high-priority thread on the target (104).

In one or more embodiments, the distributor (116) may be implemented in hardware (e.g., circuitry), software, firmware, and/or any combination thereof. In one or more embodiments, the distributor (116) includes functionality to adjust the PDU window size (108A, 108N) of initiators (102A, 102N) based on a number of receive buffers (118A, 118N) added to the shared receive queue (110). In one or more embodiments, the distributor (116) runs as a high-priority thread on the target (104).

In one or more embodiments, the shared receive queue (110) and/or the receive completion queue (112) are any type of storage unit and/or device (e.g., a file system, database, collection of tables, or any other storage mechanism) for storing data. Further, the shared receive queue (110) and/or the receive completion queue (112) may include multiple different storage units and/or devices. The multiple different storage units and/or devices may or may not be of the same type or located at the same physical site.

While FIG. 1 shows a configuration of components, other configurations may be used without departing from the scope of the invention. For example, various components may be combined to create a single component. As another example, the functionality performed by a single component may be performed by two or more components.

Figure 2:
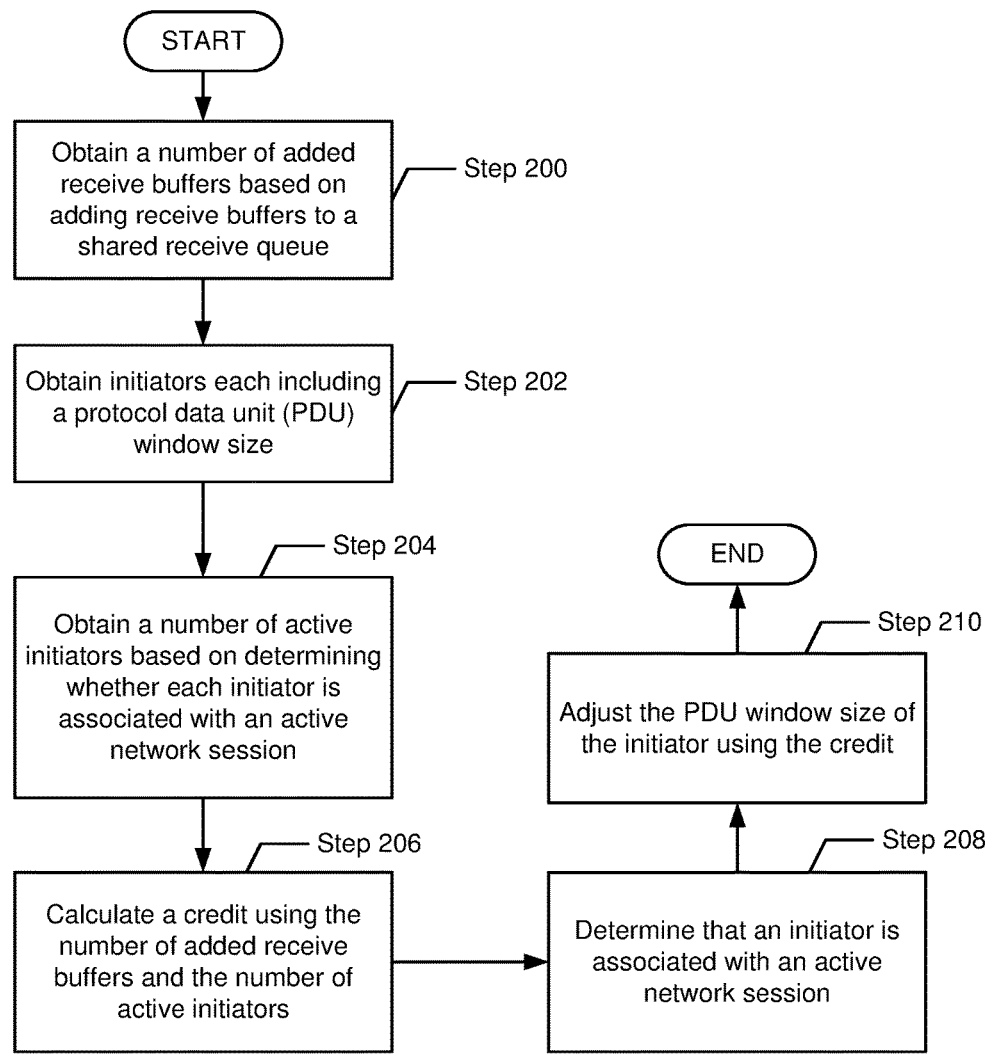
FIG. 2, FIG. 3A, and FIG. 3B show flowcharts in accordance with one or more embodiments of the invention.

FIG. 2 shows a flowchart in accordance with one or more embodiments of the invention. The flowchart depicts a process for flow control. One or more of the steps in FIG. 2 may be performed by the components (e.g., initiators (102A, 102N) and/or the target (104)) of the system (100), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a number of added receive buffers is obtained, based on adding receive buffers to a shared receive queue. The receive buffers may be added to the shared receive queue by the target (e.g., the producer). Each receive buffer may be assigned a protocol data unit (PDU) describing a task to be performed by the target (e.g., a request from an initiator to read data from, or write data to the target).

In Step 202, initiators are obtained. Each initiator may include a PDU window size. The PDU window size may describe the availability of the receive buffers in the shared receive queue. When the PDU window size is greater than zero, then the initiator may be free to transmit PDUs to the target, which may then be copied into shared receive buffers for processing by the target.

In Step 204, a number of active initiators is obtained based on determining whether each initiator is associated with an active network session. In one or more embodiments, the target tracks a timestamp (e.g., date and time of day) of last transmission for each initiator. In one or more embodiments, the initiator is associated with an active network session when the timestamp of last transmission for the initiator is within a threshold (e.g., 5 seconds) of a current timestamp. In one or more embodiments, the last transmission may include a PDU. In one or more embodiments, the last transmission may include any type of communication from the initiator. In one or more embodiments, the threshold is based on the number of active initiators (e.g., the most recently calculated number of active initiators). In one or more embodiments, the threshold may be increased by a pre-determined amount when the number of active initiators divided by the total number of initiators reaches a pre-determined ratio. For example, the threshold may be increased by 1 second when the number of active initiators divided by the total number of initiators drops to 0.5, and the threshold may be further increased by 1 second when the number of active initiators divided by the total number of initiators drops to 0.4, etc.

In one or more embodiments, the threshold is based on the number of available receive buffers of the shared receive queue. In one or more embodiments, the threshold may be increased by a pre-determined amount when the number of available receive buffers (i.e., the number of receive buffers not yet assigned a PDU) divided by the capacity (e.g., maximum number of receive buffers) of the shared receive queue reaches a pre-determined ratio. For example, the threshold may be increased by 1 second when the number of available receive buffers divided by the capacity drops to 0.5, and the threshold may be further increased by 1 second when the number of available receive buffers divided by the capacity drops to 0.4, etc.

In one or more embodiments, the target may maintain a list and a count of active initiators. For example, the list may be periodically updated by a monitoring thread that identifies inactive initiators.

In Step 206, a credit is calculated using the number of added receive buffers and the number of active initiators. The credit may be calculated by the target (e.g., the distributor). In one or more embodiments, the credit is calculated as the number of added receive buffers divided by the number of active initiators. For example, the credit may represent a portion of the added receive buffers added to the shared receive queue in Step 200 above that may be allocated to each of the active initiators. In one or more embodiments, the credit may be adjusted (e.g., multiplied) by an overshooting factor. For example, the overshooting factor may compensate for the likelihood that some of the active initiators may not actually use the additional allocated receive buffers.

In Step 208, it is determined that an initiator is associated with an active network session. For example, the initiator may have transmitted a PDU to the target within a threshold (e.g., 5 seconds) of a current timestamp.

In Step 210, the PDU window size of the initiator is adjusted using the credit. The adjusted PDU window size may be calculated by the target (e.g., the distributor). In one or more embodiments, the adjusted (e.g., increased) PDU window size is the sum of the current PDU window size of the initiator plus the credit, capped by the pre-determined maximum PDU window size. For example, if the sum exceeds the pre-determined maximum PDU window size, then the adjusted PDU window size may be set to the pre-determined maximum PDU window size. And if the sum does not exceed the pre-determined maximum PDU window size, the adjusted PDU window size may be set to the sum.

As a non-limiting example within the context of the iSCSI protocol, the target may increase the PDU window size of the initiator by sending an increased MaxCmdSN parameter to the initiator, thereby permitting the initiator to issue commands with greater command sequence numbers.

Figure 3A:
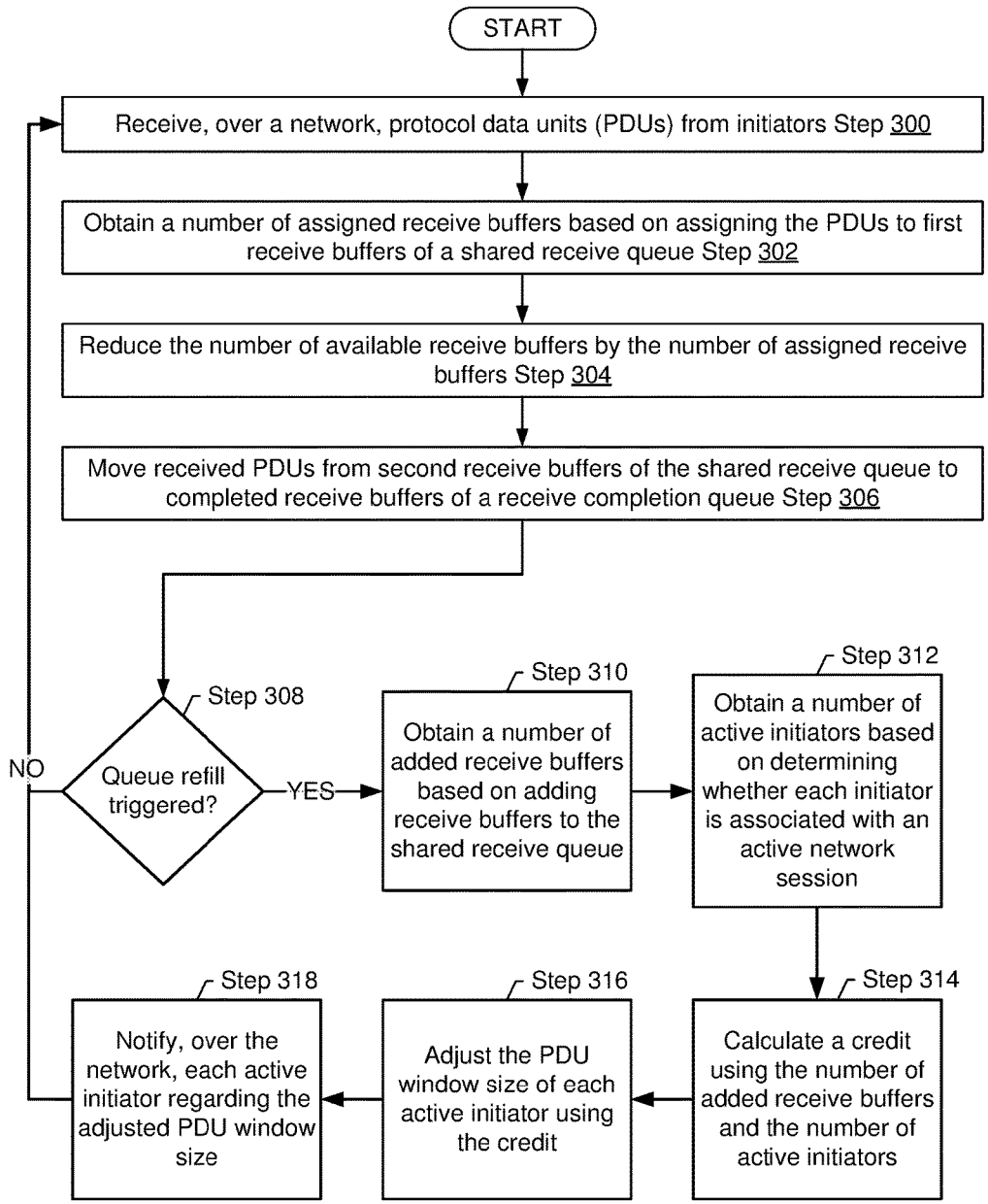

FIG. 3A shows a flowchart in accordance with one or more embodiments of the invention. The flowchart depicts a process for flow control. One or more of the steps in FIG. 3A may be performed by the components (e.g., initiators (102A, 102N) and/or the target (104)) of the system (100), discussed above in reference to FIG. 1. In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 300, PDUs are received, over a network, from initiators. Each PDU may describe a task to be performed by the target (e.g., a read request or a write request) for the initiator transmitting the PDU. In one or more embodiments, the target may send an acknowledgment of each PDU to the initiator that sent the PDU. For example, the acknowledgment may indicate that the PDU has been accepted for processing by the target. As a non-limiting example within the context of the iSCSI protocol, the target may send the command sequence number corresponding to each PDU (e.g., where the PDU corresponds to a command in the iSCSI framework) back to the initiator that sent the PDU.

In Step 302, a number of assigned receive buffers is obtained based on assigning the PDUs to first receive buffers of the shared receive queue. In one or more embodiments, assigning a PDU to a receive buffer makes the receive buffer available to store (e.g., by the target) the corresponding PDU.

In Step 304, the number of available receive buffers is reduced by the number of assigned receive buffers. That is, once a PDU is assigned to a receive buffer, the receive buffer is no longer available to be assigned any other PDU.

In Step 306, received PDUs are moved from second receive buffers of the shared receive queue to completed receive buffers of a receive completion queue. In one or more embodiments, the received PDUs are moved from their assigned receive buffers of the shared receive queue to completed receive buffers of the receive completion queue so that the received PDUs may be processed (e.g., by performing read and/or write requests corresponding to the received PDUs).

In one or more embodiments, using the information in the receive completion queue, once the task corresponding to the PDU is completed, a notification regarding the completion of the task is sent (e.g., to the initiator who sent the PDU). For example, the notification may include a confirmation that a read request has been successfully completed, as well as a location of a buffer containing the contents of the requested data.

If, in Step 308, the addition of receive buffers to the shared receive queue is triggered, then Step 310 below is performed. Otherwise, if the addition of receive buffers is not triggered, then execution continues with Step 300 above, to process additional PDUs from initiators. In one or more embodiments, the addition of receive buffers to the shared receive queue is triggered when there are no more available receive buffers in the shared receive queue. In one or more embodiments, the addition of receive buffers to the shared receive queue is triggered when the number of available receive buffers drops to a pre-determined threshold. For example, the pre-determined threshold may be a percentage (e.g., 5%) of the capacity (e.g., the maximum number of receive buffers) of the shared receive queue. In one or more embodiments, the addition of receive buffers to the shared receive queue is triggered at periodic time intervals.

More frequent triggering of the addition of receive buffers may increase the overhead of the flow control process. However, less frequent triggering of the addition of receive buffers may increase the likelihood of the shared receive queue reaching its capacity, thereby delaying the processing of PDUs transmitted by initiators.

In Step 310, a number of added receive buffers is obtained, based on adding receive buffers to a shared receive queue (see description of Step 200 above). In one or more embodiments, the additional receive buffers of the shared receive queue correspond to completed receive buffers of the receive completion queue. In other words, the completed receive buffers of the receive completion queue may be recycled (e.g., freed) for use in the shared receive queue.

In Step 312, a number of active initiators is obtained based on determining whether each initiator is associated with an active network session (see description of Step 204 above). In Step 314, a credit is calculated using the number of added receive buffers and the number of active initiators (see description of Step 206 above).

In Step 316, the PDU window size of each active initiator is adjusted using the credit (see description of Step 210 above). In Step 318, a notification is transmitted over the network to each active initiator regarding the adjusting of the PDU window size. In one or more embodiments, the notification is transmitted to the initiator (e.g., via a callback) using a response PDU that includes the adjusted PDU window size.

Figure 3B:
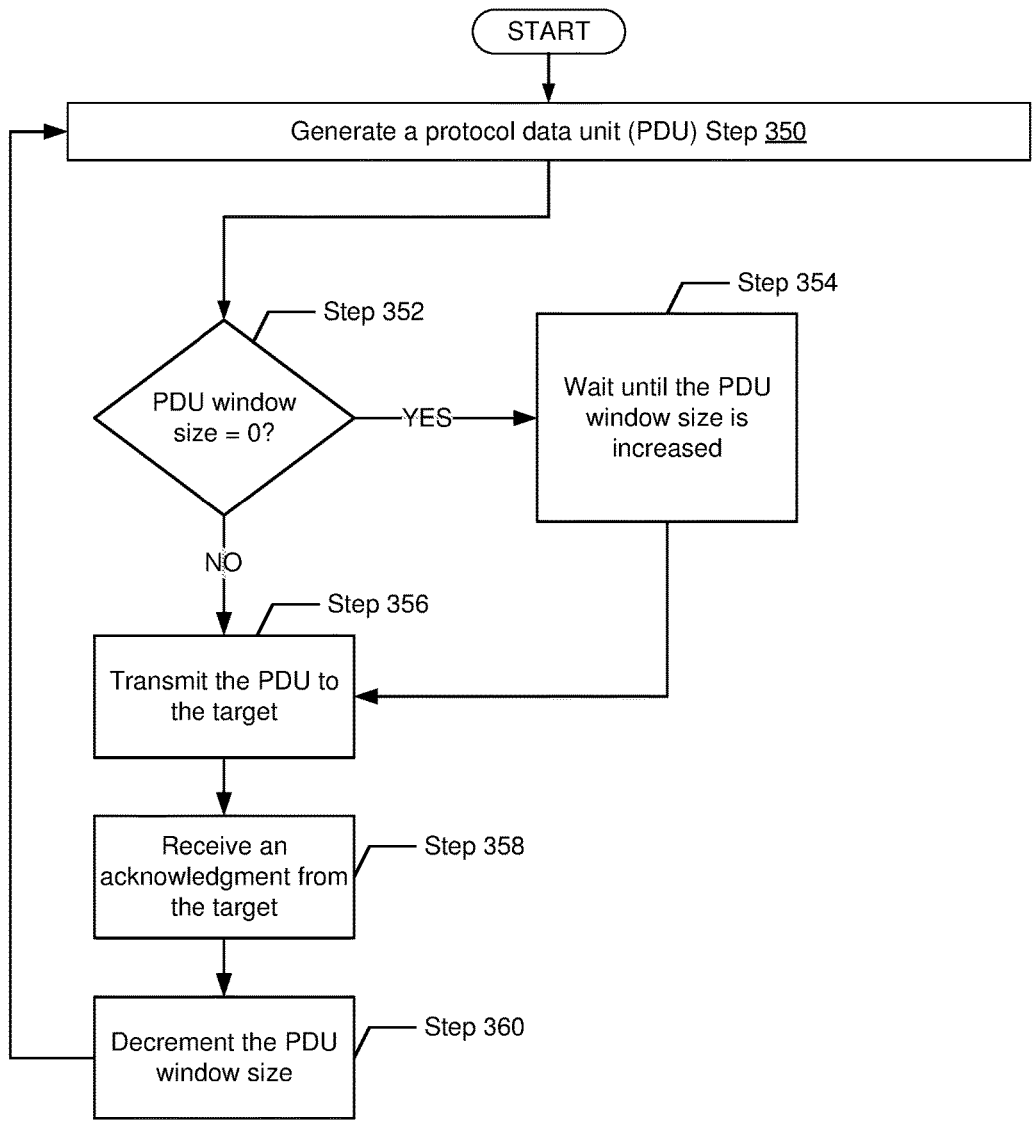

FIG. 3B shows a flowchart in accordance with one or more embodiments of the invention. The flowchart depicts a process for flow control. One or more of the steps in FIG. 3B may be performed by the components (e.g., initiators (102A, 102N)) of the system (100), discussed above in reference to FIG. 1. In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 350, a PDU is generated. The PDU may be generated by an initiator. The PDU may describe a task to be performed by the target on behalf of the initiator.

If, in Step 352, the PDU window size of the initiator equals zero, then in Step 354, the initiator waits until the PDU window size is increased (as described in Step 210 above), before proceeding to Step 356 below. That is, in order to prevent the initiator from overloading the capacity of the shared receive queue of the target, a limit is placed on the number of new PDUs that the initiator is permitted to send to the target. In one or more embodiments, a PDU buffer of the initiator includes PDUs that cannot be sent to the target by the initiator when the PDU window size is zero. Otherwise, if the PDU window size is greater than zero, then execution proceeds directly to Step 356 below.

In Step 356, the PDU is sent to the target. In one or more embodiments, if the PDU had been stored in the PDU buffer of the initiator (e.g., when the PDU window size was zero), the PDU may be removed from the PDU buffer once the PDU is transmitted to the target.

In Step 358, an acknowledgment of the PDU is received from the target. As a non-limiting example within the context of the iSCSI protocol, the acknowledgment may include the command sequence number corresponding to the PDU. In one or more embodiments, a notification regarding the completion of the task corresponding to the PDU is received from the target once the target has completed processing of the PDU (e.g., once the target has moved the PDU from a receive buffer of the shared receive queue to a completed receive buffer of the receive completion queue). For example, the notification may include a confirmation that a read request has been successfully completed, as well as a location of a buffer containing the contents of the requested data.

In Step 360, the PDU window size is decremented. In one or more embodiments, the PDU window size of the initiator is decremented each time the target acknowledges receipt and/or processing of a PDU sent by the initiator.

The following example is for explanatory purposes only and not intended to limit the scope of the invention. FIG. 4A, FIG. 4B, FIG. 4C, and FIG. 4D show an implementation example in accordance with one or more embodiments of the invention.

Figure 4A:
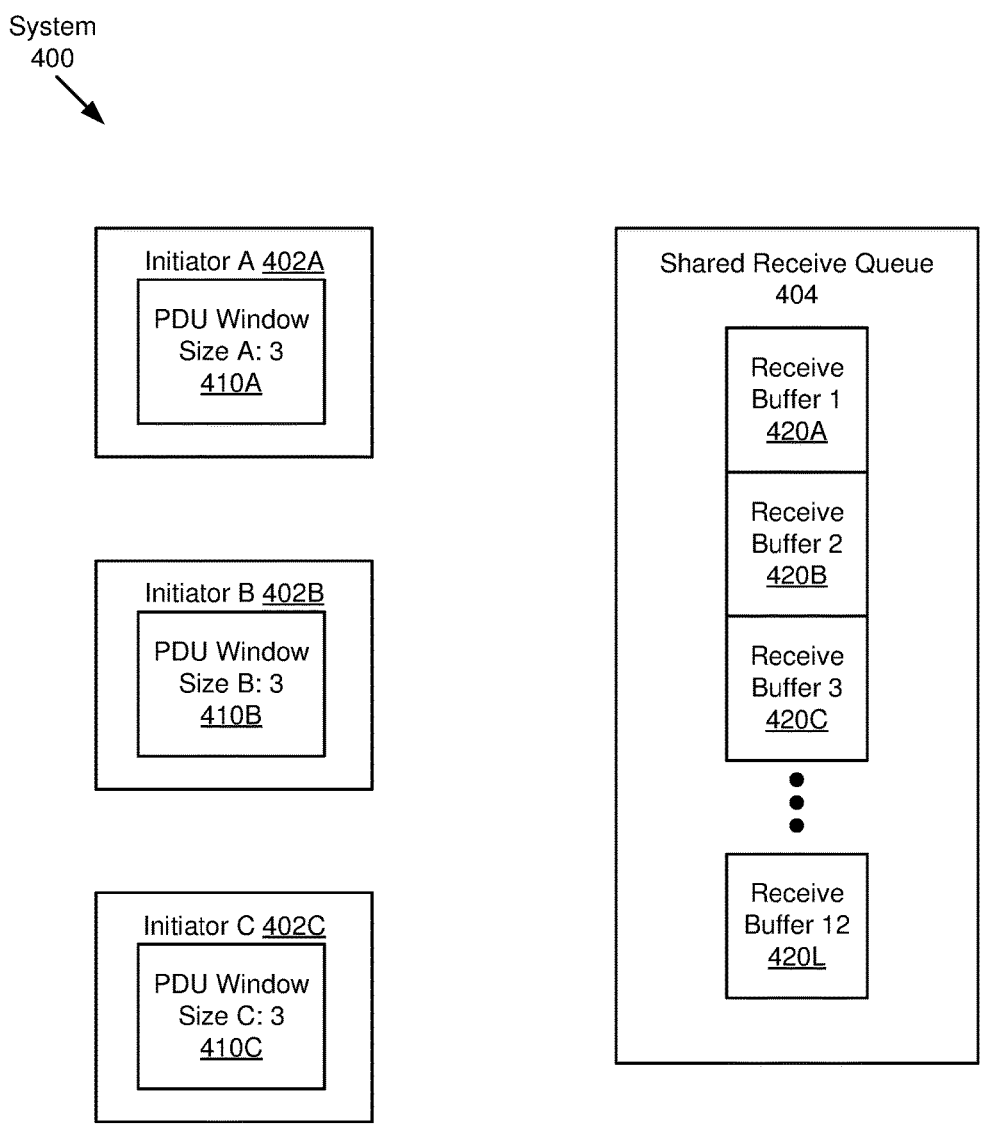
FIG. 4A, FIG. 4B, FIG. 4C, and FIG. 4D show examples in accordance with one or more embodiments of the invention.

FIG. 4A shows a system (400) including a shared receive queue (404) of the target (e.g., (104) of FIG. 1) that includes receive buffers 1 thru 12 (420A-420L), each of which is available for use. That is, no PDUs have yet been assigned to receive buffers (420A-420L). Each initiator (402A, 402B, 402C) includes a PDU window size (410A, 410B, 410C) that is set to 3. The target (104) has set a maximum PDU window size of 4.

Figure 4B:
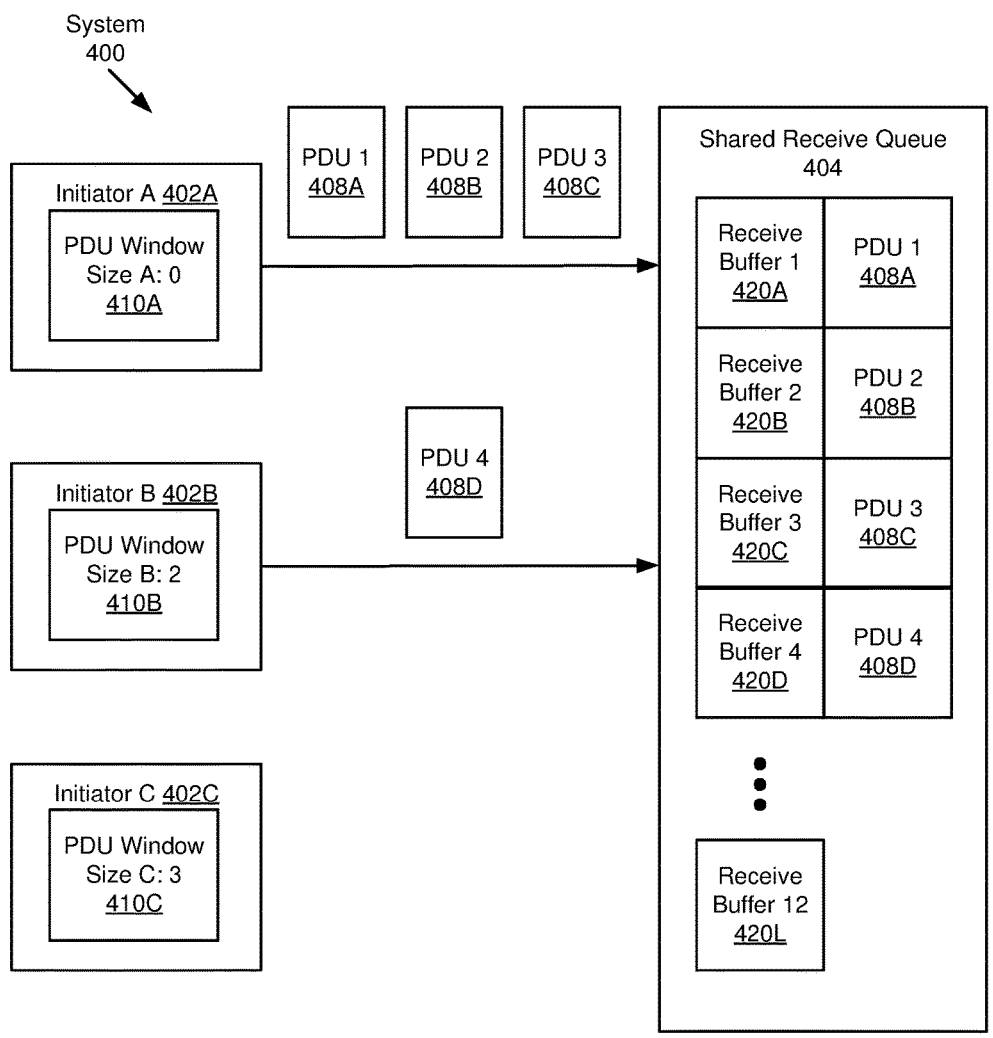

FIG. 4B shows a subsequent state of the shared receive queue (404) after the target (104) has received 4 PDUs (408A, 408B, 408C, 408D) and assigned them to receive buffers (420A, 420B, 420C, 420D) of the shared receive queue (404). Now that receipt of PDU 1 (408A), PDU 2 (408B), and PDU 3 (408C) has been acknowledged by the target (104), PDU window size A (410A) for initiator A (402A) has been reduced by 3, and is now set to zero. Similarly, now that receipt of PDU 4 (408D) has been acknowledged by the target (104), PDU window size B (410B) for initiator B (402B) has been decremented, and is now set to 2.

In FIG. 4B, initiator A (402A) is not permitted to transmit any additional PDUs to the target (104), since PDU window size A (410A) is now zero. Initiator A (402A) will therefore need to wait until PDU window size A (410A) is increased before transmitting additional PDUs to the target (104). In contrast, initiator B (402B) and initiator C (402C) are permitted to transmit additional PDUs to the target (104), since both PDU window size B (410B) and PDU window size C (410C) are above zero.

Figure 4C:
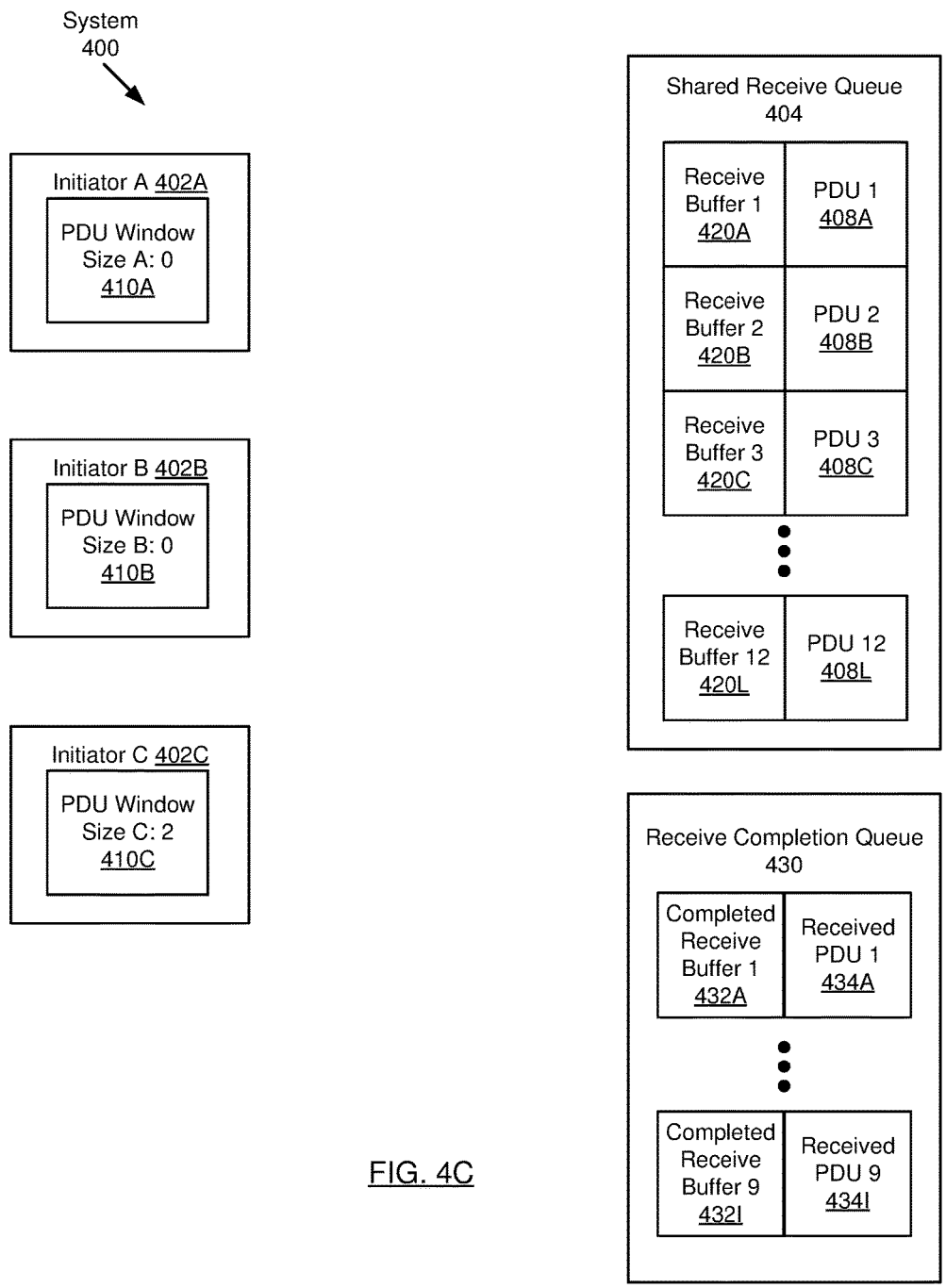

FIG. 4C illustrates the receive completion queue (430) of the target (104), which includes completed receive buffers (432A, 432I). As the target (104) completes the processing of some of the PDUs (408A, 408L) assigned to the receive buffers (420A, 420L) of the shared receive queue (404), corresponding received PDUs (434A, 434I) are assigned to the completed receive buffers (432A, 432I) of the receive completion queue (430). After the received PDUs (434A, 434I) have been used to notify the initiators corresponding to the received PDUs (434A, 434I), the completed receive buffers (432A, 432I) are available to be recycled as new receive buffers of the shared receive queue (404).

FIG. 4C also illustrates a full shared receive queue (404) with no available receive buffers (420A, 420L). That is, in FIG. 4C, each receive buffer (420A, 420L) of the shared receive queue (404) has been assigned a PDU (408A, 408L). The target (104) cannot accept any additional PDUs from initiators (402A, 402B, 402C) until additional receive buffers are added to the shared receive queue (404).

In FIG. 4C, neither initiator A (402A) nor initiator B (402B) are permitted to transmit any additional PDUs to the target (104), since PDU window size A (410A) and PDU window size B (410B) are both zero. However, PDU window size C (410C) is nonzero, due to the previous use of an overshooting factor by the target (104) to compensate for the likelihood that some of the active initiators may not use all of their allocated receive buffers.

Figure 4D:
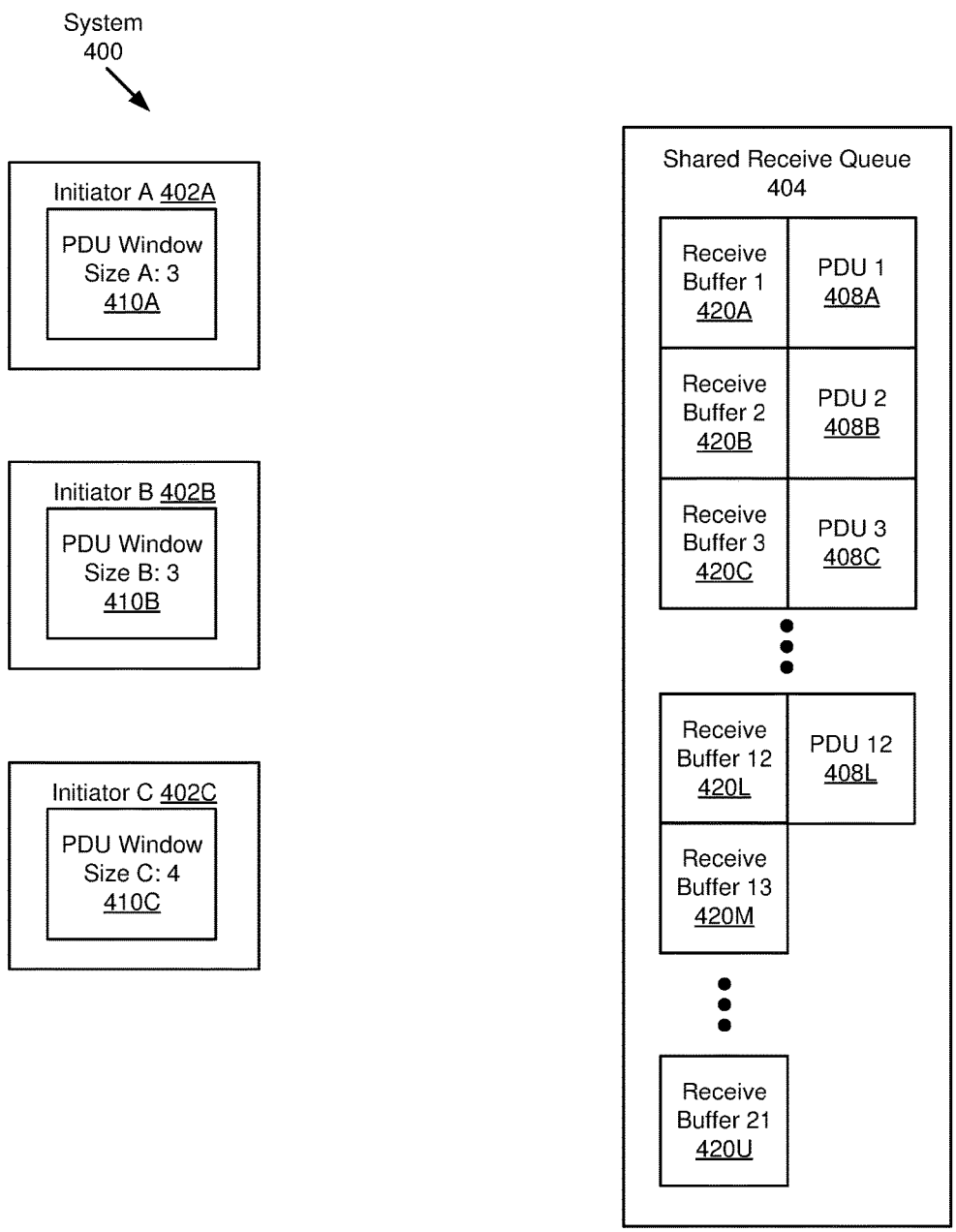

When the producer (114) of the target (104) detects the full shared receive queue (404), the producer (114) adds the (recycled) completed receive buffers (432A, 432I) of the receive completion queue (430) to the shared receive queue (404), as illustrated in FIG. 4D. FIG. 4D shows that 9 new receive buffers (420M, 420U) have been added to the shared receive queue (404). The distributor (116) of the target (104) then calculates the credit to be distributed among the active initiators. Since each initiator (402A, 402B, 402C) has transmitted a PDU within a threshold of 10 seconds of a current timestamp, the distributor (116) determines that each initiator (402A, 402B, 402C) is associated with an active network session. Therefore, the credit to be distributed to each initiator (402A, 402B, 402C) is 3 (i.e., 9 divided by 3).

The distributor (116) then calculates an adjusted PDU window size (410A, 410B, 410C) for each initiator (402A, 402B, 402C) by adding the credit to the current value of the PDU window size (410A, 410B, 410C). FIG. 4C shows the current values of the PDU window sizes (410A, 410B, 410C). In FIG. 4D, the adjusted PDU window size A (410A) of initiator A (402A) is set to 3 because the credit of 3 is added to the current PDU window size A (410A) of 0. The adjusted PDU window size B (410B) of initiator B (402B) is also set to 3 because the credit of 3 is added to the current PDU window size B (410B) of 0. The adjusted PDU window size C (410C) of initiator C (402C) is set to 4 because the credit of 3 is added to the current PDU window size C (410C) of 2, where the adjusted PDU window size C (410C) has been capped at 4, which is the maximum PDU window size set by the target (104).

Now that PDU window size A (410A) and PDU window size B (410B) are greater than zero, initiator A (402A) and initiator B (402B) may resume the transmission of PDUs to the target (104).

In the context of the iSCSI protocol, the distributor (116) may adjust the PDU window sizes (410A, 410B, 410C) by sending an increased MaxCmdSN parameter to each initiator (402A, 402B, 402C), which permits the corresponding initiator (402A, 402B, 402C) to issue commands with greater command sequence numbers. For example, the distributor (116) may increase the MaxCmdSN parameter by 3 for initiator A (402A) and initiator B (402B), and may increase the MaxCmdSN parameter by 1 for initiator C (402C).

Figure 5A:
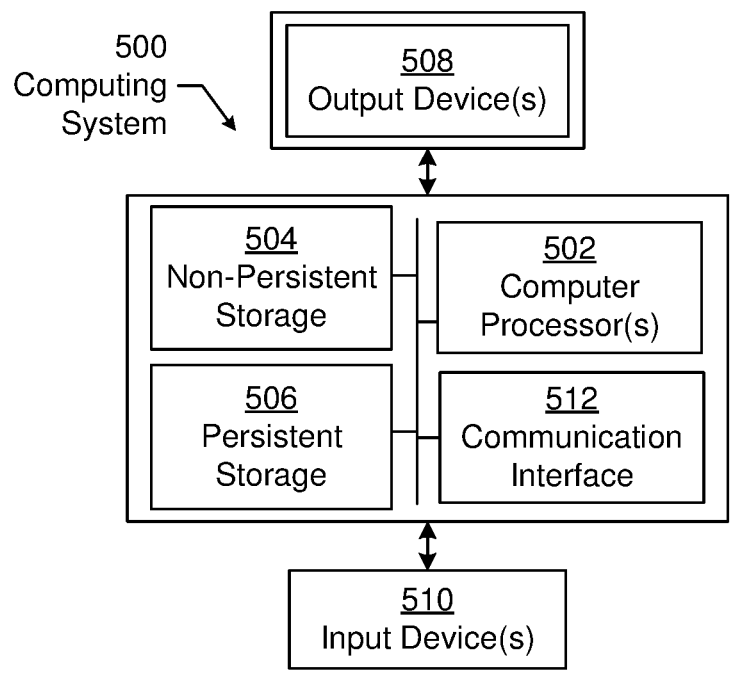
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
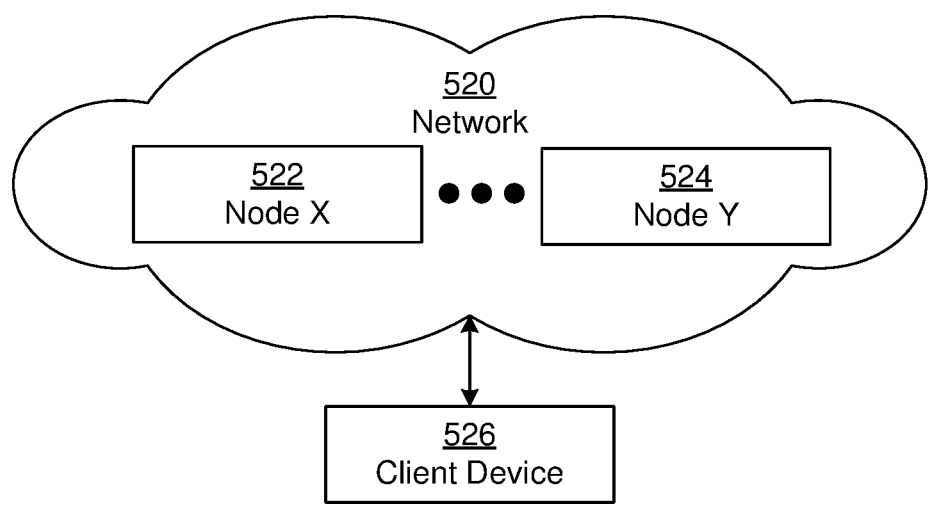

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for flow control, comprising:
   obtaining a number of added receive buffers based on adding a first plurality of receive buffers to a shared receive queue;
   obtaining a plurality of initiators each comprising a protocol data unit (PDU) window size;
   tracking, for each of the plurality of initiators, a timestamp of last transmission received from the initiator over a network;
   obtaining a current number of active initiators based on determining whether each of the plurality of initiators is associated with an active network session by determining whether the timestamp of last transmission of the initiator is within a threshold of a current timestamp, wherein the threshold is based on a previous number of active initiators;
   calculating a credit using the number of added receive buffers and the current number of active initiators;
   determining that a first initiator of the plurality of initiators is associated with an active network session; and
   adjusting the PDU window size of the first initiator using the credit.

2. The method of claim 1, wherein adjusting the PDU window size of the first initiator comprises:
   obtaining, over a network, a current PDU window size of the first initiator;
   adding the credit to the current PDU window size to obtain a new PDU window size; and
   setting the PDU window size of the first initiator to be the smaller of the new PDU window size and a predetermined maximum PDU window size.

3. The method of claim 1, further comprising:
   receiving, over a network, a plurality of PDUs from the plurality of initiators;
   obtaining a number of assigned receive buffers based on assigning the plurality of PDUs to the first plurality of receive buffers; and
   reducing a number of available receive buffers by the number of assigned receive buffers.

4. The method of claim 3, further comprising:
   adjusting the PDU window size of a second initiator of the plurality of initiators based on receiving, from the second initiator, a PDU of the plurality of PDUs.

5. The method of claim 1, further comprising:
   obtaining a second plurality of receive buffers of the shared receive queue; and
   moving, prior to adding the first plurality of receive buffers, a plurality of PDUs from the second plurality of receive buffers to a plurality of completed receive buffers of a receive completion queue,
   wherein the first plurality of receive buffers corresponds to the plurality of completed receive buffers of the receive completion queue.

6. The method of claim 1, further comprising:
   transmitting, over a network, a notification to the first initiator regarding the adjusting of the PDU window size.

7. A system for flow control, comprising:
   a plurality of initiators each comprising a protocol data unit (PDU) window size; and
   a target comprising a shared receive queue, wherein the target is configured to:
      obtain a number of added receive buffers based on adding a first plurality of receive buffers to the shared receive queue;
      track, for each of the plurality of initiators, a timestamp of last transmission received from the initiator over a network;
      obtain a current number of active initiators based on determining whether each of the plurality of initiators is associated with an active network session by determining whether the timestamp of last transmission of the initiator is within a threshold of a current timestamp, wherein the threshold is based on a previous number of active initiators;
      calculate a credit using the number of added receive buffers and the current number of active initiators;
      determine that a first initiator of the plurality of initiators is associated with an active network session; and
      adjust the PDU window size of the first initiator using the credit.

8. The system of claim 7, wherein adjusting the PDU window size of the first initiator comprises:
   obtaining, over a network, a current PDU window size of the first initiator;
   adding the credit to the current PDU window size to obtain a new PDU window size; and
   setting the PDU window size of the first initiator to be the smaller of the new PDU window size and a predetermined maximum PDU window size.

9. The system of claim 7, wherein the target is further configured to:
   receive, over a network, a plurality of PDUs from the plurality of initiators;
   obtain a number of assigned receive buffers based on assigning the plurality of PDUs to the first plurality of receive buffers; and
   reduce a number of available receive buffers by the number of assigned receive buffers.

10. The system of claim 9, wherein the target is further configured to:

adjust the PDU window size of a second initiator of the plurality of initiators based on receiving, from the second initiator, a PDU of the plurality of PDUs.

11. The system of claim 7, wherein the system further comprises a receive completion queue, wherein the target is further configured to:
obtain a second plurality of receive buffers of the shared receive queue; and
move, prior to adding the first plurality of receive buffers, a plurality of PDUs from the second plurality of receive buffers to a plurality of completed receive buffers of the receive completion queue,
wherein the first plurality of receive buffers corresponds to the plurality of completed receive buffers of the receive completion queue.

12. A non-transitory computer readable medium comprising instructions that, when executed by a processor, perform a method for flow control, comprising:
obtaining a number of added receive buffers based on adding a first plurality of receive buffers to a shared receive queue;
obtaining a plurality of initiators each comprising a protocol data unit (PDU) window size;
tracking, for each of the plurality of initiators, a timestamp of last transmission received from the initiator over a network;
obtaining a current number of active initiators based on determining whether each of the plurality of initiators is associated with an active network session by determining whether the timestamp of last transmission of the initiator is within a threshold of a current timestamp, wherein the threshold is based on a previous number of active initiators;
calculating a credit using the number of added receive buffers and the current number of active initiators;
determining that a first initiator of the plurality of initiators is associated with an active network session; and
adjusting the PDU window size of the first initiator using the credit.

13. The non-transitory computer readable medium of claim 12, wherein adjusting the PDU window size of the first initiator comprises:
obtaining, over a network, a current PDU window size of the first initiator;
adding the credit to the current PDU window size to obtain a new PDU window size; and
setting the PDU window size of the first initiator to be the smaller of the new PDU window size and a predetermined maximum PDU window size.

14. The non-transitory computer readable medium of claim 12, wherein the method further comprises:
receiving, over a network, a plurality of PDUs from the plurality of initiators;
obtaining a number of assigned receive buffers based on assigning the plurality of PDUs to the first plurality of receive buffers; and
reducing a number of available receive buffers by the number of assigned receive buffers.

15. The non-transitory computer readable medium of claim 12, wherein the method further comprises:
obtaining a second plurality of receive buffers of the shared receive queue; and
moving, prior to adding the first plurality of receive buffers, a plurality of PDUs from the second plurality of receive buffers to a plurality of completed receive buffers of a receive completion queue,
wherein the first plurality of receive buffers corresponds to the plurality of completed receive buffers of the receive completion queue.

* * * * *